United States Patent [19]

von der Heide et al.

[11] Patent Number: 4,647,803
[45] Date of Patent: Mar. 3, 1987

[54] ELECTRIC MOTOR, PARTICULARLY A BRUSHLESS DIRECT CURRENT MOTOR

[75] Inventors: Johann von der Heide, Schramberg; Rolf Müller; Ernst-Moritz Körner, both of St. Georgen, all of Fed. Rep. of Germany

[73] Assignee: Papst-Motoren GmbH & Co. KG, St. Georgen, Fed. Rep. of Germany

[21] Appl. No.: 753,801

[22] Filed: Jul. 8, 1985

Related U.S. Application Data

[63] Continuation of Ser. No. 570,187, Jan. 12, 1984, abandoned.

[30] Foreign Application Priority Data

Dec. 28, 1983 [DE] Fed. Rep. of Germany ....... 3347360

[51] Int. Cl.[4] .............................................. H02K 5/24
[52] U.S. Cl. .................................. 310/51; 310/67 R; 310/90
[58] Field of Search ...................... 310/51, 67, 157, 90, 310/43; 318/138, 254 A, 254

[56] References Cited

U.S. PATENT DOCUMENTS

| | | | |
|---|---|---|---|
| 1,852,807 | 4/1932 | Janssen | 310/157 |
| 2,874,008 | 2/1959 | Orte et al. | 310/51 X |
| 3,217,195 | 11/1965 | Ferranti | 310/67 X |
| 3,253,170 | 5/1966 | Phillips et al. | 310/51 X |
| 3,483,407 | 12/1969 | Frohmüller et al. | 310/51 |
| 3,512,021 | 5/1970 | St. Laurent, Jr. | 310/67 |
| 3,527,969 | 9/1970 | Papst | 310/51 |
| 4,056,744 | 11/1977 | Blanchard et al. | 310/51 |
| 4,099,104 | 7/1978 | Müller | 318/138 |

*Primary Examiner*—Donovan F. Duggan
*Attorney, Agent, or Firm*—Fitch, Even, Tabin & Flannery

[57] ABSTRACT

Electric motor with a substantially cylindrical air gap between the stator and the rotor, the stator being fitted to a bearing support for the rotor shaft bearing. In order to reduce noise emissions, the stator is connected to the bearing support by means of an elastic damper and the stator and bearing support are separated from one another by an air gap adjacent at least part of their facing faces.

24 Claims, 6 Drawing Figures

4,647,803

ELECTRIC MOTOR, PARTICULARLY A BRUSHLESS DIRECT CURRENT MOTOR

This application is a continuation, of application Ser. No. 570,187 filed Jan. 12, 1984, now abandoned.

The present invention relates to an electric motor, particularly in the form of a brushless direct current motor, which is preferably intended for driving disk memories. However, it is also suitable for other driving functions, particularly in the office sphere. It has a substantially cylindrical air gap between the stator and the rotor, the stator being fitted to a bearing member for bearing the rotor shaft.

The admissible noise emission values for equipment used at working locations in offices are constantly being reduced and this more particularly applies to computers used in such locations. Such computers nowadays have a very high computing and storage capacity and are generally equipped with disk memories, particularly rigid or hard disk stores, as well as fans. The only components which emit noise in such a case are the driving motors for the disk memories and fans.

In connection with a disk memory, consideration could be given to the idea of e.g. either suspending the complete motor in an elastic manner, or to elastically fit the ball bearings used for rotor shaft bearing purposes and, which as is known, constitute the main noise source. However, these two measures are not practicable in the case of a disk memory, because e.g. in the case of a rigid disk memory, non-reproducible position changes of the rotor shaft, i.e. the non-reproducible eccentricity, must e.g. be less than 1 $\mu$m.

SUMMARY OF THE INVENTION

The problem of the invention is to provide an electric motor, particularly a commutatorless or brushless direct current motor, suitable for driving disk memories, but also other equipment and which has a particularly low noise emission level and which can also have a very small, non-reproducible eccentricity.

On the basis of an electric motor of the aforementioned type, according to the invention this problem is solved in that the stator is connected to the bearing support part by elastic damping means. Such a construction effectively reduces bearing noise, because sound waves produced in the bearing arrangement, e.g. the ball bearings, are no longer reflected against the stator and are consequently prevented from passing backwards and forwards between bearing and stator. However, in the stator, electromagnetically produced noise is prevented from being reflected backwards and forwards between the stator and the bearing. Such electromagnetically produced noise can in particular occur due to axial and/or radial electromagnetic disturbing forces between rotor and stator.

The elastic damper is preferably axially spaced from the rotor shaft bearing. It can appropriately have a soft casting compound between the stator and the bearing member and, advantageously, following hardening, forms an intermediate part positively connected to the stator and/or bearing support. This intermediate member is appropriately circular. Such a damping arrangement can be manufactured particularly easily and ensures extensive damping between the bearing support and the stator. According to a modified embodiment, the elastic damping means can also have one or more prefabricated elastic components, particularly elastic O-rings. In order to securely mount the stator on the bearing support part, of the cross-section of the O-ring preferably engages in a corresponding groove on the facing faces of the stator and/or bearing support.

According to another inventive solution proposal for the aforementioned problem, the stator and the bearing support are separated from one another by an air gap over a substantial portion of their facing faces. Such an air gap leads to a significant reduction to the electric motor noise level. However, it can advantageously be provided in combination with the aforementioned elastic damping means. The air gap preferably separates the stator and the bearing support in the area critical for noise transmission purposes and which is adjacent to the rotor shaft bearing.

In the case of the combined use of the elastic damping means and the aforementioned air gap, the stator and bearing support part are preferably interconnected substantially only in the area of the elastic damping means, while being separated from one another elsewhere by the air gap.

According to another feature of the invention, the rotor shaft is mounted in two ball bearings, with in each case different numbers of balls. This feature also reduces noise emission and can be provided alone or together with one or more of the previously discussed inventive features.

Electric motors of the aforementioned type, particularly for driving disk memories are known, in which the bearing support is in turn connected to a mounting flange extending substantially perpendicular to the rotor shaft axis. In the case of such an electric motor, the aforementioned problem can be solved by providing the mounting flange with a sound-absorbing layer. This feature can also be used alone, or can be combined with one or more of the aforementioned measures.

If, as is known per se (Ser. No. 440,537) the mounting flange carries a printed circuit board and/or a magnetic shield, according to a further development of the invention, the mounting flange is connected with the printed circuit board and/or the magnetic shield to form a sound-absorbing multilayer body. A soft casting compound and/or an elastic adhesive can appropriately be provided between the layers of the multilayer body. It has been found that a significant noise reduction is even possible if, for reasons of positional accuracy of the rotor axis relative to the mounting flange, the latter and the bearing support are constructed in one piece.

In the case of an electric motor, in which the rotor is constructed as an external rotor with a substantially cup-shaped rotor casing (cf e.g. Ser. No. 440,537), noise emissions are considerably reduced by openings located in the bottom of the rotor casing. This feature can also be provided alone or in combination with one or more of the previous features.

Corresponding to a further feature of the invention, in the case of an electric motor of the aforementioned type, axial and/or radial electromagnetic disturbing forces are minimized to reduce noise between the rotor and stator and once again this feature can be used alone or in conjunction with one or more of the aforementioned features. The magnetic components of the rotor and stator can be arranged symmetrically to the another to minimize disturbing forces. However, this solution is not always practicable with constructional means.

Particularly when in the case of a brushless direct current motor for the rotor position-dependent commutation of the currents in the motor windings, one or more galvanomagnetic sensors, e.g. Hall generators or Hall-IC's are used, which are located in the influence range of the rotor magnetic field, a certain axial projection of the rotor magnets is required on the side facing the sensor or sensors, in order to ensure a magnetic flux density adequate for controlling the sensors. On the opposite side, the axial projection is appropriately much smaller, in order to economize on expensive magnetic material and/or the axial overall length. Thus, a permanent magnetic rotor is obtained, which is arranged asymmetrically with respect to the axial plane of symmetry of the stator iron. The different sizes of the axial projections leads to an axial force being exerted on the rotor, whose magnet attempts to adjust itself symmetrically to the stator iron. This force is generally rotation position-dependent, e.g. because the air gap between the rotor and the stator does not have the same dimensions throughout. This can lead to the aforementioned electromagnetically produced noise. However, in a further development of the invention, this can be counteracted in such an asymmetrical arrangement in that the stator carries an end plate, which cooperates with the rotor magnet for the axial symmetrization of the magnetic field and preferably defines at least part of the air gap in the vicinity of the larger projection.

According to a modified embodiment of the invention, electromagnetically caused noise can be reduced in that, in the vicinity of the larger axial projection, the induction in the central part of the rotor magnetic poles is made at least zonally weaker than in the marginal areas of said poles adjacent to the pole clearances. This also ensures an axial force symmetrization, together with a reliable response or operation of the rotation position sensors.

What is decisive is that the magnetic components of the rotor and stator are arranged symmetrically to one another, i.e. that a magnetic symmetrization takes place in such a way that the sum of the magnetic axial forces between the rotor and the stator are as small as possible and preferably zero in the case of the finally fitted motor.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

Figure 1:
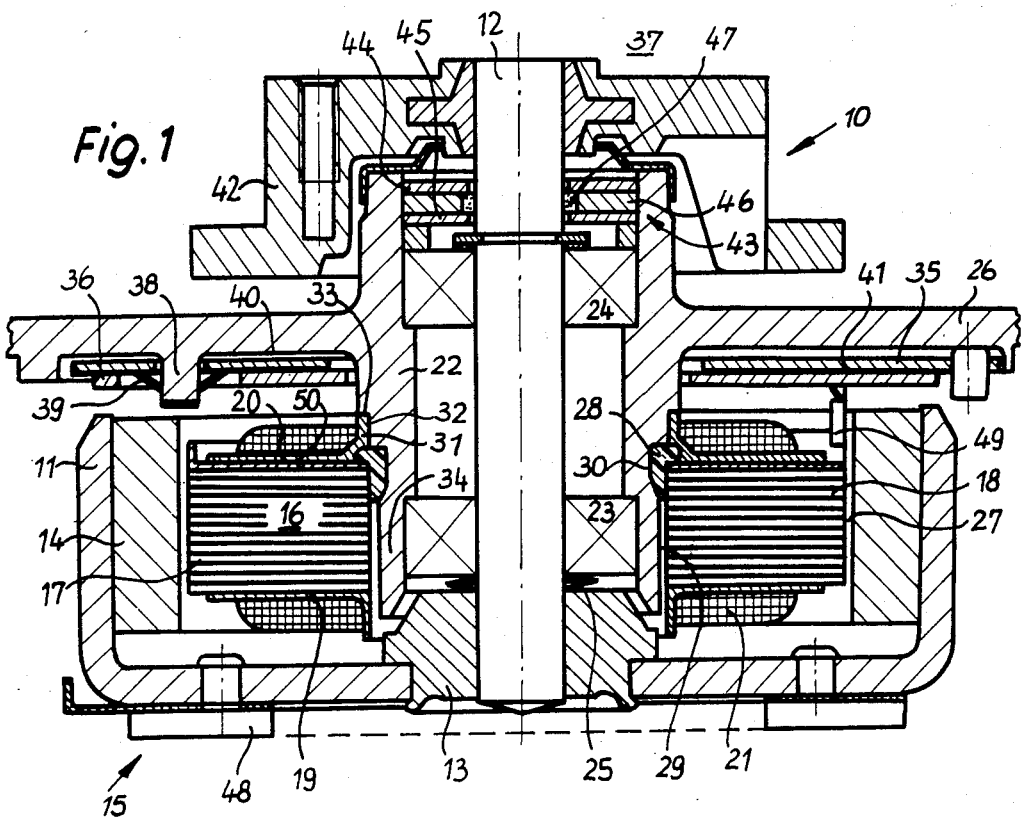
FIG. 1 a section through a driving motor for a rigid disk store constructed according to the invention.

FIG. 1 shows an external rotor-type direct driving motor for rigid disk stores constructed as a brushless direct current motor, designated overall by reference numeral 10. The motor has a cup-shaped rotor casing 11, which is concentric to a rotor shaft 12 and is fixed thereto by means of a bush 13, which is pressed into a central opening of the rotor casing. The rotor casing 11, which is made from good magnetically conducting material, has a plurality of permanent magnetic pieces or a one-part permanent magnetic ring 14 which, together with components 11 to 13 form the rotor 15 of motor 10. The permanent magnetic ring 14 is preferably made from a mixture of hard ferrite, e.g. barium ferrite, and elastic material and constitutes a so-called rubber magnet. The latter is trapezoidally or approximately trapezoidally radially magnetized over the pole pitch in the case of a relatively small pole clearance. Rotor casing 11 can be constructed as a deep-drawn part.

Included in stator 16 of motor 10 is in particular a winding core 17, which comprises the actual stator iron 18, generally in the form of stator plates, as well as end plates 19, 20 and which carries a stator winding 21. Winding core 17 is supported on a tubular bearing support part 22. Rotor shaft 12 is mounted in the bearing support 22 with the aid of two ball bearings 23, 24, whose facing faces are supported on corresponding shoulders of bearing support part 22 and which have different numbers of balls. A cup spring 25 engages with the bottom of the inner ring of ball bearing 23 and the face of bush 13 facing said ball bearing, so that the ball bearings are axially braced against one another. The bearing support means, together with a mounting flange 26, forms a one-piece die casting. Instead of this, the bearing support part can also be located by force-fit in a hub connected to the mounting flange, or can be fixed to the latter in some other way, e.g. by soldering. Magnetic ring 14 and winding core 17 define a substantially cylindrical air gap 27.

As shown in FIG. 1, stator 16 is connected to bearing support 22 by means of an elastic damping arrangement, which is located axially above ball bearing 23 and which comprises an annular intermediate member 28 made from a soft casting compound. In the area located axially below the intermediate member 28 in FIG. 1, stator 16 and bearing support 22 are separated from one another by a narrow air gap 29. During the installation of motor 10, initially a bead made from an elastic casting compound, e.g. a polyurethane-hardener mixture, is placed in a groove 30 on the circumferential surface of the bearing support 22. Stator 16 is then placed on bearing support part 22, until the inner face of an annular shoulder 31 of end plate 20 engages with a portion 32 of the circumferential surface of bearing support 22, while its end face engages with a shoulder of the latter. Stator 16 is centered with respect to the axis of rotor shaft 12. The casting compound is then hardened. The elastic intermediate member 28 formed in this way ensures a positive connection between stator 16 and bearing support 22 which, in conjunction with air gap 29, effectively damps the acoustic vibration transmission between components 16 and 22. The mechanical connection of components 16 to 22 is, according to the embodiment of FIG. 1, at a point which is axially spaced from the location of the main noise source. The wall of bearing support part 22 can elastically withdraw or move aside in the vicinity of the bearing zone 34 of the outer ring of ball bearing 23. All this contributes to a considerable reduction of noise emissions.

Figure 3:
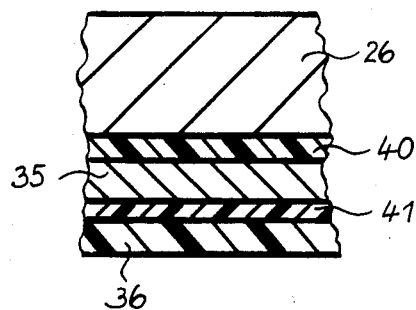
FIG. 3 a larger scale partial section through the fixing flange of the motor according to FIG. 1 with a printed circuit board and a magnetic shield.

A shielding plate 35 made from a good magnetically conducting material and a printed circuit board 36 are located on the bottom of mounting flange 26. In conjunction with rotor casing 11 and ball bearing 24, shielding plate 35 prevents the escape of magnetic stray fields into the space 37 taken up by the rigid storage disks. Drive electronics and possibly a speed control circuit (not shown) are located on printed circuit board 36. The e.g. aluminium die casting mounting flange 26 has lugs 38, which project through recesses in components 35, 36 and on which are mounted spring clips 39 for securing the shielding plate 35. As can be more clearly seen in FIG. 3, between mounting flange 26 and shielding plate 35 is provided a casting compound, e.g. polyurethane layer 40, while between the shielding plate 35 and printed circuit board 36 is placed a layer 41 of epoxide resin adhesive or some other sound-absorbing material. Mounting flange 26, shielding plate 35 and printed circuit board 36 are in this way combined into a sound-absorbing multilayer body. It is obvious that the positions of the shielding plate and printed circuit board can be interchanged. In addition, both layers 40, 41 can be made from casting compound, adhesive or some other acoustic vibration-damping material.

Mounting flange 26 makes it possible to fit motor 10 to a partition of the rigid disk store which, in known manner (e.g. Ser. No. 127,404) separates space 37 from the remainder of the interior of the apparatus. A hub 42 for receiving one or more hard storage disks is fixed to the upper end of rotor shaft 12 in FIG. 1. In order to seal the bearing system of rotor shaft 12 with respect to the storage disk reception area, a magnetic fluid seal 43 is placed in the bearing support 22 between hub 42 and bearing 24. Seal 43 comprises two pole pieces 44, 45 a permanent magnetic ring 46 located between the pole pieces and a magnetic fluid which is introduced into an annular clearance 47 between magnetic ring 46 and rotor shaft 12. A radial impeller 48 is fixed to the outside of the base of rotor casing 11 and draws in air in the central air and discharges it radially outwards.

Figure 2:
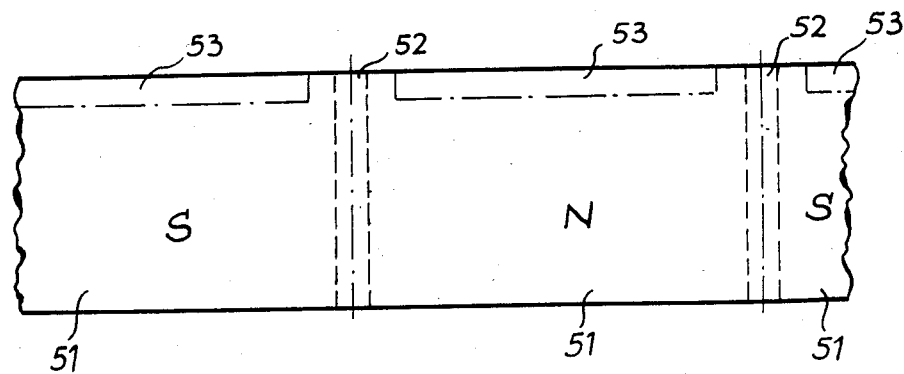
FIG. 2 a partial development of the rotor magnet of the motor of FIG. 1.

According to FIG. 1, a galvanomagnetic rotation position sensor, e.g. in the form of a Hall generator 49 is provided for controlling the commutation of motor 10. The sensor is soldered to the printed circuit board 36 and is influenced by the field of annular magnet 14. To ensure that sensor 49 reliably operates, the annular magnet 14 projects axially further over stator iron 18 on the side facing printed circuit board 36 than on the side facing the bottom of rotor casing 11. In order to counteract axial disturbing forces which are produced and which could give rise to noise, a stator end plate 50 is provided on the side with the larger axial projection. End plate 50 projects into the area of the axially further projecting annular magnet 14 and limits the air gap 27 there in a predetermined partial zone. In this way, there is a symmetrization of the magnetic field. In addition to or instead of this, magnet 14 can be deliberately partially demagnetized in the vicinity of the large axial projection, as shown in FIG. 2. The annular magnetic poles are 51, the pole clearances 52 and the areas with reduced magnetization 53. The partial demagnetization areas 53 are spaced from the pole clearances. This ensures a completely satisfactory operation of sensor 49, while the partial demagnetization with respect to the magnetic axial forces acts in the same way as a shortening of the larger projection. The present application hereby incorporates by reference the entire description and drawings of the commonly owned application Ser. No. 06/391 145, filed on June 23rd, 1982, now U.S. Pat. No. 4,574,211.

Figure 4:
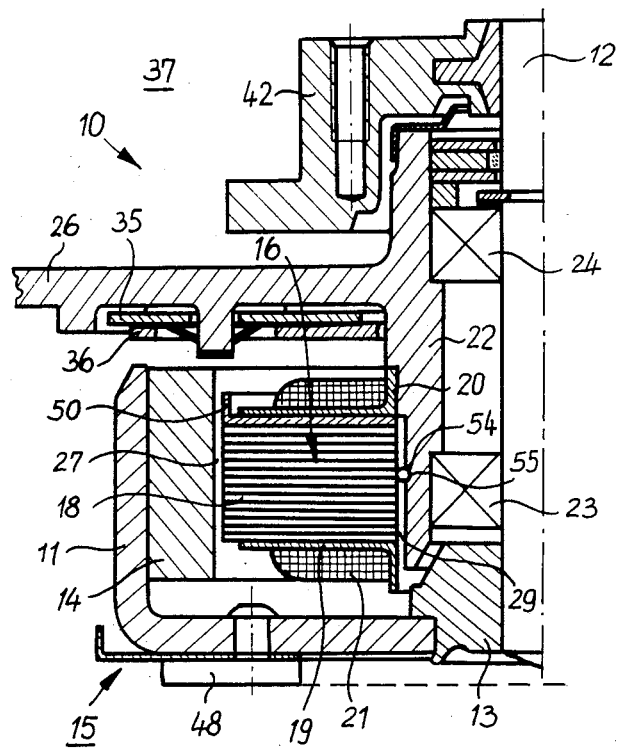
FIG. 4 a modified embodiment similar to FIG. 1 and in section.

The embodiment according to FIG. 4 coincides with that of FIG. 1 with the exception that an O-ring 54 is provided in place of intermediate member 28. O-ring 54 engages in an annular groove 55 on the circumferential surface of bearing support 22. Optionally, a corresponding groove can be provided in the stator iron.

Figure 5:
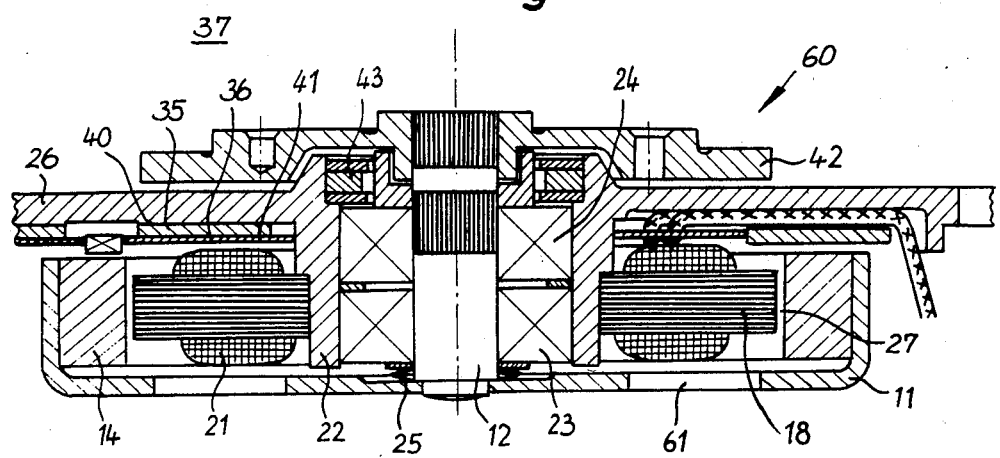
FIG. 5 a section through a disk store driving motor in accordance with a further modified embodiment of the invention.
Figure 6:
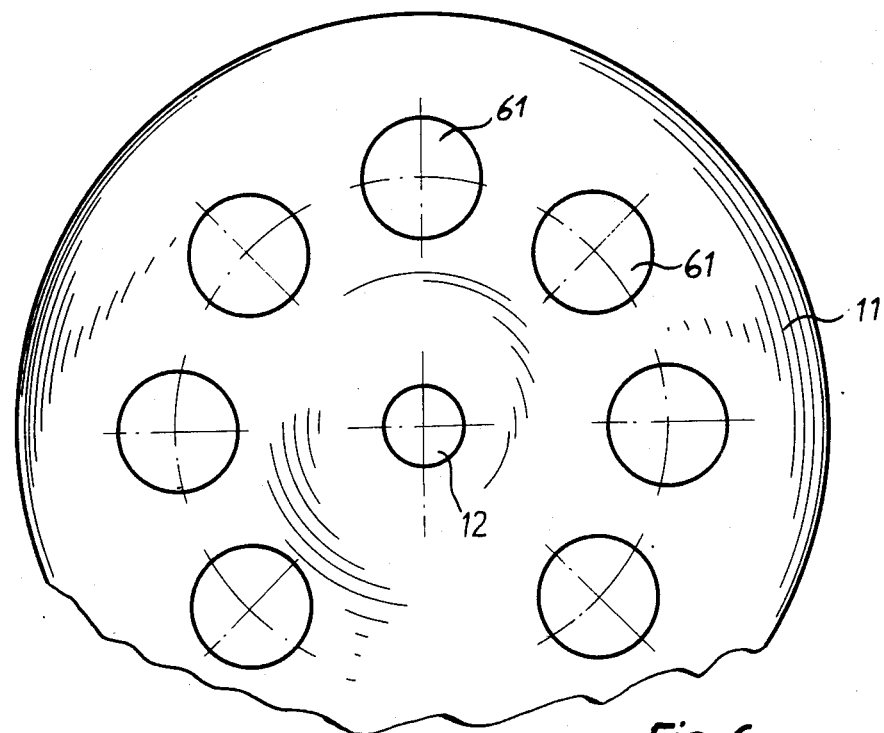
FIG. 6 a plan view of the bottom of the rotor casing of the motor according to FIG. 5.

FIG. 5 shows a particularly flat motor 60, parts having the same function as those of the embodiment of FIG. 1 are given the same reference numerals and will not be explained again. In this case, the noise reduction function is served by the sound-absorbing multilayer construction of mounting flange 26, shielding plate 35, printed circuit board 36 and the interposed layers 40, 41, as well as openings 61 distributed over the bottom of rotor casing 11. Rotor casing 11 provided with the opening 61 constitutes a reversal of the principle of the piston loudspeaker in a closed box. There are preferably seven equidistant openings.

Of course, the aforementioned sound-absorption measures can in each case be used alone or in random combinations. Sliding bearings can be used in place of ball bearings.

We claim:
1. An electric motor, particularly a brushless direct current motor, comprising:
   a stator and a rotor which define a substantially cylindrical air gap therebetween, said stator including stator iron means;
   a rotor shaft supporting said rotor and mounted for common rotation therewith;
   bearing means rotatingly mounting said rotor shaft;
   stationary, substantially tubular bearing support means disposed in coaxial relationship to said rotor shaft and having an outer facing peripheral wall, said bearing means being mounted inside of said bearing support means and being supported thereby, said stator having an inner facing wall and being mounted on the outside of said bearing support means and being supported thereby, the inner facing wall of the stator facing the outer facing wall of the bearing support means;
   said stator wall and said bearing support means wall being separated from one another over at least a substantial portion of their facing faces by a second air gap defined therebetween which extends also over a substantial portion of the axial length of said stator iron means; and
   elastic damping means connecting said stator to said bearing support means.

2. An electric motor according to claim 1, wherein the elastic damping means is disposed near the rotor shaft bearing and is preferably made axially short.

3. An electric motor according to claim 1, wherein the elastic damping means includes a soft casting compound between the stator and the bearing support means.

4. An electric motor according to claim 3, wherein the soft casting compound, after hardening, forms an intermediate member positively connected to at least one of the stator and the bearing support means.

5. An electric motor according to claim 4, wherein the intermediate member has an annular shape.

6. An electric motor according to claim 1, wherein the elastic damping means is at least one elastic O-ring.

7. An electric motor according to claim 6, wherein the O-ring engages with part of its cross-section in a corresponding groove on the facing faces of at least one of the stator and bearing support means.

8. An electric motor according to claim 1 wherein the bearing support means is in turn connected to a mounting flange extending substantially perpendicularly to the rotor shaft axis, and wherein the mounting flange includes a sound-absorbing layer.

9. An electric motor according to claim 8 wherein the rotor shaft is mounted in first and second ball bearings with a different number of balls disposed circumferentially in the first bearing as compared to the number of balls disposed circumferentially in the second bearing.

10. An electric motor, particularly a brushless direct current motor, comprising a stator and a rotor which define a substantially cylindrical air gap therebetween, said stator including stator iron means;

a rotor shaft supporting said rotor and mounted for common rotation therewith;

bearing means rotatingly mounting said rotor shaft;

stationary, substantially tubular bearing support means disposed in coaxial relationship to said rotor shaft and having an outer facing peripheral wall, said bearing means being mounted inside of said bearing support means and being supported thereby, said stator having an inner facing wall and being mounted on the outside of said bearing support means and being supported thereby, the inner facing wall of the stator facing the outer facing wall of the bearing support means;

said stator wall and said bearing support means wall being separated from one another over at least a substantial portion of their facing faces by a second air gap defined therebetween which extends also over a substantial portion of the axial length of said stator iron means.

11. An electric motor according to claim 10, wherein the second air gap separates said stator from said bearing support means adjacent at least a portion of said bearing means.

12. An electric motor according to claim 10, wherein the bearing support means is in turn connected to a mounting flange extending substantially perpendicularly to the rotor shaft axis, and further comprising a sound-absorbing layer on said mounting flange.

13. An electric motor according to claim 12, wherein the mounting flange has mounted thereon at least one of a printed circuit board and a magnetic shield, and wherein said sound-absorbing layer includes at least one of said printed circuit board and magnetic shield to form a sound-absorbing multilayer body.

14. An electric motor according to claim 13, wherein at least one of a soft casting compound and an elastic adhesive is provided between the layers of the multilayer body.

15. An electric motor according to claim 12, wherein the mounting flange and the bearing support part means are constructed in one piece.

16. An electric motor according to claim 10, wherein electromagnetic forces act between the rotor and stator and wherein the magnetic components of the rotor and stator are arranged symmetrically to one another to minimize the magnetic forces for noise reduction purposes.

17. An electric motor according to claim 10, with a permanent magnetic rotor arranged asymmetrically with respect to the axial plane of symmetry of the stator iron, further comprising an end plate mounted on the stator, which end plate together with the rotor magnet causes axial symmetrization of the magnetic field.

18. An electric motor according to claim 17, wherein the rotor magnet projects axially over the stator iron at its two end faces and the end plate defines at least part of the air gap adjacent the larger projection of the rotor.

19. An electric motor according to claim 10, with a permanent magnetic rotor having clearances between adjacent poles, wherein the rotor magnet projects axially over the stator iron at its two end faces and adjacent the larger projection the induction in the central area of the rotor magnetic poles is at least zonally weaker than in the marginal regions of the rotor magnetic poles adjacent the pole clearances.

20. An electric motor according to claim 10 wherein the rotor shaft is mounted in first and second ball bearings with a different number of balls disposed circumferentially in the first bearing as compared to the number of balls disposed circumferentially in the second bearing.

21. An electric motor, particularly a brushless direct current motor, comprising a stator and rotor which define a substantially cylindrical air gap therebetween, said stator including stator iron means;

a rotor shaft supporting said rotor and mounted for common rotation therewith;

bearing means rotatingly mounting said rotor shaft;

stationary, substantially tubular bearing support means disposed in coaxial relationship to said rotor shaft, said bearing means being mounted inside of said bearing support means and being supported thereby, said stator being mounted on the outside of said bearing support means and being supported thereby;

said bearing means including first and second ball bearings with a different number of balls disposed circumferentially in the first bearing as compared to the number of balls disposed circumferentially in the second bearing.

22. An electric motor, particularly a brushless direct current motor, comprising a stator and a rotor which define a substantially cylindrical air gap therebetween, said stator including stator iron means;

a rotor shaft supporting said rotor and mounted for common rotation therewith;

bearing means rotatingly mounting said rotor shaft;

stationary, substantially tubular bearing support means disposed in coaxial relationship to said rotor shaft and having an outer facing peripheral wall, said bearing means being mounted inside of said bearing support means and being supported thereby, said stator having an inner facing wall and being mounted on the outside of said bearing support means and being supported thereby, the inner facing wall of the stator facing the outer facing wall of the bearing support means;

said stator wall and said bearing support means wall being separated from one another over at least a substantial portion of their facing faces by a second air gap defined therebetween which extends also over a substantial portion of the axial length of said stator iron means;

said rotor being constructed as an external rotor with a substantially cup-shaped rotor casing having openings distributed over the closed end of the cup-shaped casing.

23. An electric motor, particularly a brushless direct current motor, comprising a stator and a rotor which define a substantially cylindrical air gap therebetween, said stator including stator iron means;

a rotor shaft supporting said rotor and mounted for common rotation therewith;

bearing means rotatingly mounting said rotor shaft;

stationary, substantially tubular bearing support means disposed in coaxial relationship to said rotor shaft and having an outer facing peripheral wall, said bearing means being mounted inside of said bearing support means and being supported thereby, said stator having an inner facing wall and being mounted on the outside of said bearing support means and being supported thereby, the inner facing wall of the stator facing the outer facing wall of the bearing support means;

said stator wall and said bearing support means wall being separated from one another over at least a substantial portion of their facing faces by a second air gap defined therebetween which extends also over a substantial portion of the axial length of said stator iron means;

elastic damping means connecting said stator to said bearing support means;

said rotor being constructed as an external rotor with a substantially cup-shaped rotor casing having openings distributed over the closed end of the cup-shaped casing.

24. An electric motor, particularly a brushless direct current motor, comprising a stator and a rotor which define a substantially cylindrical air gap therebetween, said stator including stator iron means and a coil creating an electromagnetic field when energized, said rotor mounting a permanent magnet ring, electromagnetic forces acting between the rotor and the stator when the coil is energized;

a rotor shaft supporting said rotor and mounted for common rotation therewith;

bearing means rotatingly mounting said rotor shaft;

stationary, substantially tubular bearing support means disposed in coaxial relationship to said rotor shaft, said bearing means being mounted inside of said bearing support means and being supported thereby, said stator being mounted on the outside of said bearing support means and being supported thereby;

the magnetic components of the rotor and stator being arranged symmetrically to one another whereby the sum of the magnetic axial forces between the rotor and stator are minimized for noise reduction purposes.

* * * * *